United States Patent
Figueira et al.

(10) Patent No.: US 7,394,808 B2
(45) Date of Patent: Jul. 1, 2008

(54) METHOD AND APPARATUS FOR IMPLEMENTING SCHEDULING ALGORITHMS IN A NETWORK ELEMENT

(75) Inventors: Norival Figueira, Campbell, CA (US); Huiwen Li, San Jose, CA (US); Guyves Achtari, Ottawa (CA)

(73) Assignee: Nortel Networks Limited (CA)

( * ) Notice: Subject to any disclaimer, the term of this patent is extended or adjusted under 35 U.S.C. 154(b) by 756 days.

(21) Appl. No.: 10/852,317

(22) Filed: May 24, 2004

(65) Prior Publication Data

US 2005/0259574 A1 Nov. 24, 2005

(51) Int. Cl.
*H04L 12/28* (2006.01)
*H04L 12/56* (2006.01)

(52) U.S. Cl. ...................................... 370/389

(58) Field of Classification Search ................. 370/229, 370/395, 413, 230, 235, 412, 386, 392, 352, 370/354, 232, 254, 389, 429; 709/200, 208, 709/207, 222, 203, 232, 100; 398/54
See application file for complete search history.

(56) References Cited

U.S. PATENT DOCUMENTS

| | | | | |
|---|---|---|---|---|
| 6,515,963 | B1 * | 2/2003 | Bechtolsheim et al. | 370/229 |
| 6,665,495 | B1 * | 12/2003 | Miles et al. | 398/54 |
| 6,829,217 | B1 * | 12/2004 | Bechtolsheim et al. | 370/229 |
| 7,158,512 | B1 * | 1/2007 | Kamhine | 370/389 |
| 7,215,641 | B1 * | 5/2007 | Bechtolsheim et al. | 370/235 |
| 7,251,216 | B2 * | 7/2007 | Dube et al. | 370/232 |
| 7,263,097 | B1 * | 8/2007 | Ornes et al. | 370/386 |
| 2002/0103921 | A1 * | 8/2002 | Nair et al. | 709/232 |
| 2002/0176431 | A1 * | 11/2002 | Golla et al. | 370/412 |

* cited by examiner

*Primary Examiner*—Wing F. Chan
*Assistant Examiner*—Prenell P Jones
(74) *Attorney, Agent, or Firm*—Anderson Gorecki & Manaras LLP

(57) ABSTRACT

Device-wide performance guarantees may be implemented in a network element using a pull forwarding scheme by using separate processes on the network element communicating via handshake signals to enable coordination between the aspects of the network element. One class of processes execute at the ingress queues, a second class of process execut at junction points, and a final class of processes execute at the egress ports. The combination of these separate processes leads to the correct scheduling of frames in a device-wide manner as if there were a centralized scheduler with complete information about all queued frames. As a result, the performance guarantees of the intended scheduling algorithm are preserved and are provided in a device-wide manner. The scheduling algorithms that are supported include round-robin, deficit round robin, negative deficit round robin, weighted round robin, and strict priority.

19 Claims, 5 Drawing Sheets

METHOD AND APPARATUS FOR IMPLEMENTING SCHEDULING ALGORITHMS IN A NETWORK ELEMENT

BACKGROUND OF THE INVENTION

1. Field of the Invention

The present invention relates to communication networks and, more particularly, to a method and apparatus for implementing scheduling algorithms in a network element.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

A network element may have many ports, each of which may maintain multiple data queues. For example, a network element may maintain an ingress queue at an input port for each output port, each flow being handled by that port, or may maintain ingress queues in a number of other manners. Maintaining different queues for different classes or types of traffic allows the network element to treat the different classes of traffic differently. The number of ingress and egress queues will depend on the forwarding scheme being implemented in the network element, i.e., how frames are forward from the ingress ports to the egress ports, and the scheduling algorithm used by the network element.

A scheduling algorithm selects, between queued frames, a particular frame to be handled by the network element. Since frames are queued at the ingress and egress ports, the scheduling algorithm will operate to selectively forward frames from the ingress queues to the egress queues, and from the egress queues onto the network.

Within the network element, it would be desirable to allow a scheduling algorithm to be implemented on a device-wide basis, so that frames received on different ports on the network element may be treated fairly and in accordance with the scheduling algorithm. Unfortunately, this is difficult to implement as it requires communication of information between the ingress ports and egress ports, since frames are queued in both locations. Conventionally, two forwarding schemes have been used to forward frames within a network element from the ingress ports to the egress ports—a push forwarding scheme and a pull forwarding scheme.

With a push forwarding scheme, the ingress ports control how frames are sent to the egress ports, and each ingress port makes determinations independent of the other ingress ports using a local scheduling algorithm. The egress port may also queue frames (using egress queues) and use a scheduling algorithm to decide which frame is to be forwarded next among all locally queued frames. Since there is no device-wide frame scheduling mechanism, it is difficult for a network element to preserve the performance guarantees provided by the individual scheduling algorithms, since the individual schedulers at the ingress queues make local decisions based on only local information.

With a pull forwarding scheme, the egress ports control the transfer of frames from the ingress ports. Since it is usually not economically feasible to provide a scheduler running at the egress port with information about queued frames at the ingress ports, the pull forwarding scheme has usually not allowed for the implementation of scalable network elements that can provide device-wide performance guarantees.

SUMMARY OF THE INVENTION

The present invention overcomes these and other drawbacks by providing a method and apparatus for implementing scheduling algorithms in a network element. According to an embodiment of the invention, device-wide performance guarantees may be implemented in a network element using a pull forwarding scheme by using separate processes on the network element communicating via handshake signals to enable coordination between the aspects of the network element. One class of processes execute at the ingress queues, a second class of process execut at junction points, and a final class of processes execute at the egress ports. The combination of these separate processes leads to the correct scheduling of frames in a device-wide manner as if there were a centralized scheduler with complete information about all queued frames. As a result, the performance guarantees of the intended scheduling algorithm are preserved and are provided in a device-wide manner. The scheduling algorithms that are supported include round-robin, deficit round robin, negative deficit round robin, weighted round robin, and strict priority, as well as other scheduling algorithms.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
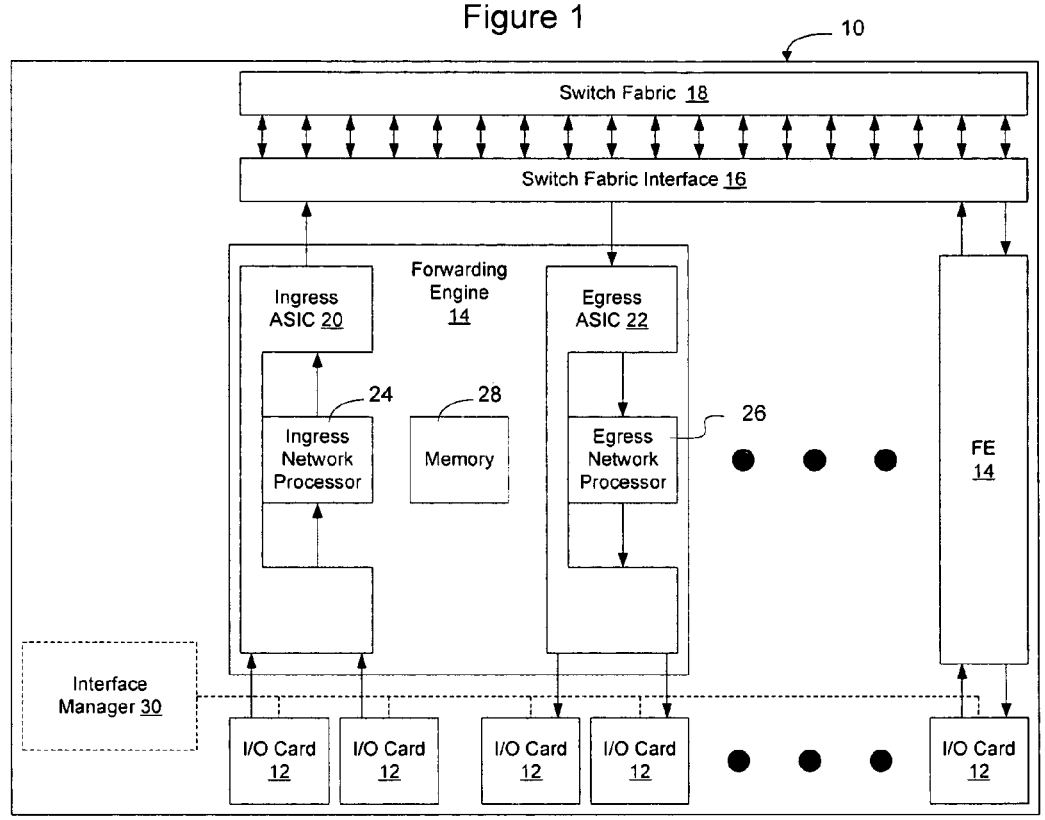
FIG. 1 is a functional block diagram of a network element that may be configured to implement an embodiment of the invention.

FIG. 1 illustrates one embodiment of a network element 10 that may be configured to implement an embodiment of the invention. The invention is not limited to a network element configured as illustrated, however, as the invention may be implemented on a network element configured in many different ways. The discussion of the specific structure and methods of operation of the embodiment illustrated in FIG. 1 is intended only to provide one example of how the invention may be used and implemented in a particular instance. The invention more broadly may be used in connection with any network element configured to handle protocol data units on a communications network. The network element of FIG. 1 may be configured to be used in many different areas of a communication network to handle traffic on the network.

As shown in FIG. 1, the network element 10 in this embodiment includes Input/Output (I/O) cards 12 configured to connect to links on the communications network. One or more forwarding engines 14 are provided in the network element to process frames received over the I/O cards 12. The forwarding engines 14 forward the received frames to a switch fabric interface 16, which passes the frames to a switch fabric 18. The data may be logically associated into packets, frames, segments, or into another type of protocol data unit. Although reception of a frame will be used to illustrate an embodiment of the invention, the invention is not limited in this manner as the network element may similarly operate on any other type of protocol data unit. The switch fabric 18 enables a frame entering on a port on an I/O card 12 to be output at a different port on the same or a different I/O card in a conventional manner.

A frame returning from the switch fabric 18 is received by one of the forwarding engines 14 and passed to one or more of the I/O cards 12. The frame may be handled by the same forwarding engine 14 on both the ingress and egress paths. Optionally, where more than one forwarding engine 14 is included in the network element 10, a given frame may be handled by different forwarding engines on the ingress and egress paths. The invention is not limited to any particular forwarding engine 14, switch fabric interface 16, or switch fabric 18, but rather may be implemented in any suitable network element configured to handle frames of data on a network. One or more Application Specific Integrated Circuits (ASICs) 20, 22 and processors 24, 26 may be provided as well to implement instructions and processes on the forwarding engines 14. Optionally, a memory 28 may be included to store data and instructions for use by the forwarding engines.

An interface manager 30 and other control plane components may be provided to establish an environment for creation of interfaces over the ports on the I/O cards, and otherwise control operation of the I/O cards and forwarding engines. The invention is not limited to a particular control plane structure or the manner in which the transport plane, including the I/O cards, forwarding engines, and switch fabric components, are controlled or managed in the network element 10.

Figure 2:
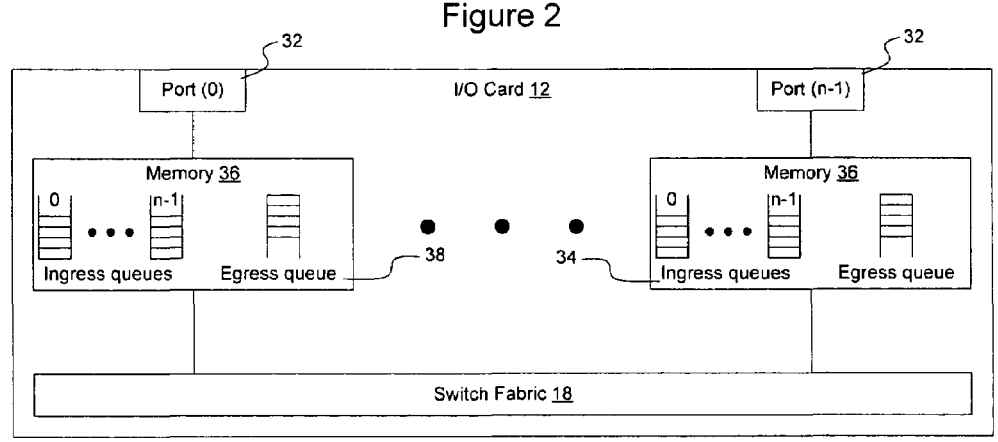
FIG. 2 is a functional block diagram of a one-level forwarding plane architecture.

FIG. 2 illustrates a one-dimensional forwarding plane architecture. For simplicity, the forwarding engines and switch fabric interface have not been illustrated in this figure so that operation of the forwarding plane may be described more succinctly. The invention is not limited to a forwarding plane architecture with only these several illustrated components as numerous other components may be included in the forwarding plane architecture as well.

As shown in FIG. 2, the forwarding plane architecture includes a plurality of ports 32, each of which includes a physical interface such as an optical port, electrical port, wireless port, infrared port, or another port, configured to communicate with conventional physical media. Frames received at the port 32 are placed in queues 34 in a memory 36 to be output to be transmitted to an egress port over the switch fabric 18. The queues may be formed in shared memory to minimize the number of memory modules that must be used to implement the port 32.

A given port may be required to maintain multiple queues to enable the network element to maintain control over how traffic is handled on the network element. For example, the network element may want traffic to be queued at the ingress port on a per-egress port basis. In this scheme, the ingress port would determine an egress port for an incoming received frame and place the frame in a queue in the shared memory for the particular egress port. Queuing frames in the input card on a per egress port basis allows each input port card to output some traffic over a particular egress port in a fair manner and provides sundry other benefits. There are many different queuing strategies that may be employed to enable traffic to be controlled on the ingress and egress ports. For example, frames may be queued on a per input port basis, per flow basis, or in many other ways. The invention is not limited to a particular queuing strategy. Additionally, frames may be queued in egress queues 38 at the egress ports as well as at the ingress ports. These egress queues 38 may share the same memory 36 with the ingress queues 34 or may be provided with their own memory. Conventionally queues have been implemented using a first in first out (FIFO) data structure, although the invention is not limited in this manner.

Figure 3:
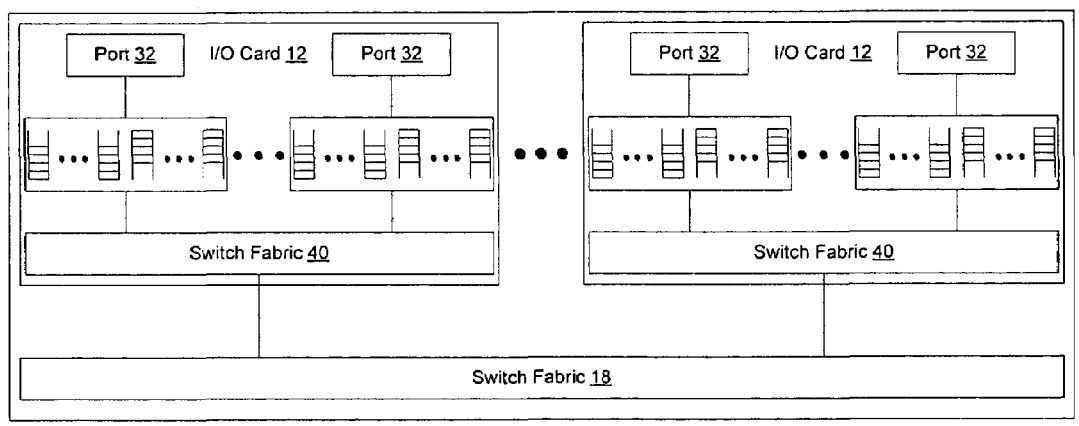
FIG. 3 is a functional block diagram of an hierarchical forwarding plane architecture.

FIG. 3 illustrates a hierarchical forwarding plane architecture in which multiple I/O cards, each with its own switch fabric 40, are connected together by a network element switch fabric 18. Normally, a hierarchical architecture is used to facilitate partitioning of the hardware logic into a number of physical boards, and also to reduce the number of data path connections the individual switch fabrics are required to support. In this embodiment, ports on the I/O cards receive data and queue the data in the same manner described above. However in this embodiment inter-card coordination is required to enable scheduling to be performed in a device-wide manner.

As described in greater detail below, embodiments of the invention allow selection between the ingress queues to be performed in a device-wide manner to enable transmission of frames from the ingress queues to be coordinated between ports and between other logical partitions on the network element.

The function of a scheduling algorithm is to decide from the several queues containing frames, which queue will be served next and also which frames (including how many of them) from that queue will be served, i.e., forwarded to the egress port. Once a queue has been served, the scheduling algorithm selects another queue and the process iterates.

According to an embodiment of the invention, a scheduling algorithm can be implemented to allow for device-wide performance guarantees using a pull forwarding scheme. In one embodiment, the scheduling algorithm is divided into several processes, with one process executed per ingress queue, one process executed at each of the junction points in the architecture, and a final process executed at the egress port. The combination of these separate processes leads to the correct scheduling of frames in a device-wide manner as if there were a centralized scheduler with complete information about all queued frames. As a result, the performance guarantees of the intended scheduling algorithm are preserved and are provided in a device-wide manner.

Multiple scheduling algorithms may be supported, particularly the class of algorithms in which the queue selection process is independent of the frame selection process, and vice-versa. In this class of algorithms, the only information required for the selection of the next queue to be served is the previous sequence of queue selections and which queues are currently available for service, which depends on the particular scheduling algorithm. For example, with round-robin scheduling, a queue is available for service if it is non-empty. With deficit round-robin, a queue is available for service if it is non-empty and if its deficit counter plus a quantum amount is larger than or equal to the size of the frame at the head of the queue. The selection of how many frames and which frames should be served when a queue is selected for service depends only on information obtained from the queue itself. For example, with round-robin scheduling, only one frame typically is served. With deficit round-robin, frames are served until the deficit counter of the queue is smaller than the size of the next frame in the queue.

The proposed method supports many scheduling algorithms including: round-robin scheduling algorithms (where queues are served one frame at a time in round-robin order), deficit round-robin, negative deficit round-robin, weighted round-robin (where queues are served a fixed number of frames at a time in round-robin order, where the number of frames served from a queue depends on its assigned weight), strict priority (where queues are assigned priorities and non-empty higher priority queues are served first), and many other scheduling algorithms. The invention is not limited to implementation of a particular scheduling algorithm or to one of these mentioned scheduling algorithms.

Figure 4:
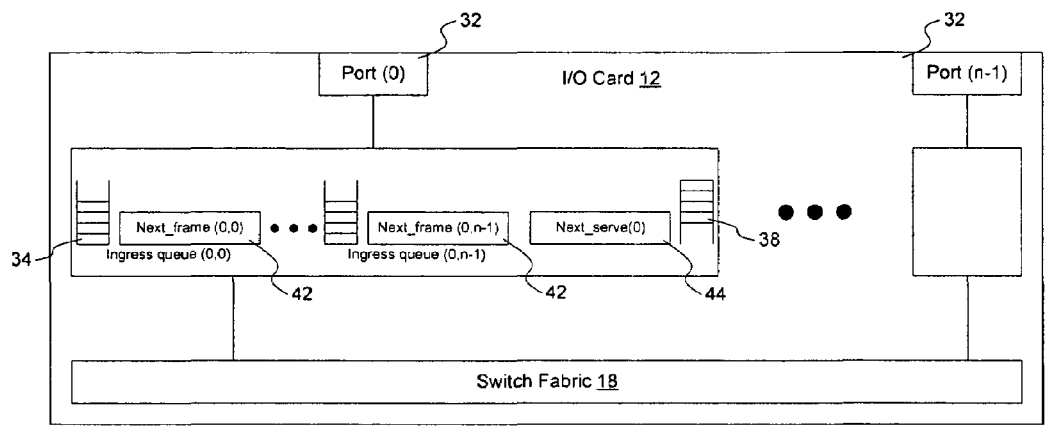
FIG. 4 is a functional block diagram of a one-dimensional forwarding plane architecture including frame and port coordination processes according to an embodiment of the invention.

FIG. 4 illustrates a forwarding plane including coordination processes according to an embodiment of the invention. In the embodiment of FIG. 4, the network element includes n ports numbered from 0 to n−1. For simplicity, it will be assumed that each port also has n ingress queues (one for each egress port) and that the network element is configured to queue frames on a per egress port basis. The invention is not limited in this manner as each ingress port may have any desired number of ingress queues, and frames can be queued on a per-flow basis or on a different basis. The described algorithm works for any number of ingress queues using per-flow queuing, per-port queuing, or any other desired queuing criteria.

In this example, the egress port uses a single egress queue 38 to store frames. To avoid egress queue overflow, it will be assumed that the egress port back-pressures the ingress ports whenever the egress queue is becoming full. The ingress queue currently being served will then pause until the back-pressure signal is released. For the purposes of the proposed scheme, it is irrelevant whether the ingress queue pauses in between frames or during the transmission of a frame.

According to an embodiment of the invention, two separate processes running on different places in the network element coordinate their actions to implement a desired device-wide scheduling algorithm. In the embodiment illustrated in FIG. 4, the scheduling algorithm is realized by two types of processes: next_frame processes 42 associated with each ingress queue at each port, and a next_serve process 44 associated with each egress port. Specifically, as shown in FIG. 4, each ingress queue has its own next_frame process. The next_frame(i,j) process controls the ingress queue j of port i that stores frames to be sent to egress port j, i.e., it controls ingress queue (i,j). The next_serve(j) process then coordinates with the next_frame (0 to n−1, j) processes to implement the scheduling algorithm between the associated ingress queues. The next_serve process controls which next_frame process will be allowed to transmit a frame to that egress port. Thus, in FIG. 4, the next_serve(0) controls which ingress queue on each of the ports 0 to n−1 will be next to transmit a frame to egress port 0.

Figure 5:
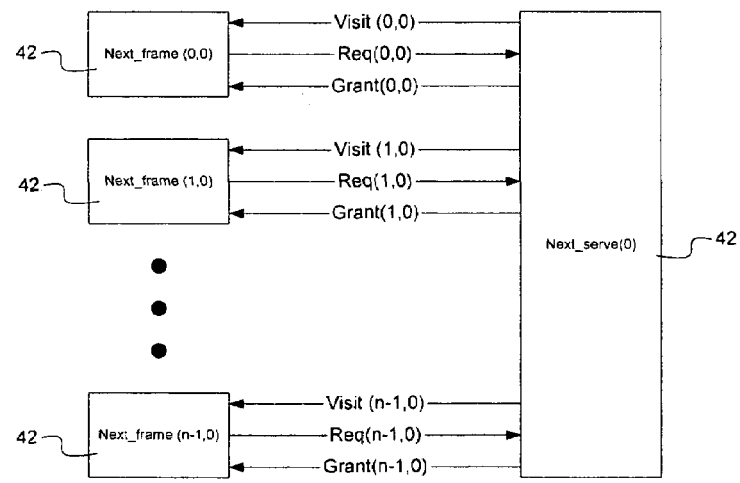
FIG. 5 is a functional block diagram illustrating signals exchanged between the frame and port coordination processes of FIG. 4.

FIG. 5 shows the signal connections for next_serve(0); similar signal connections would be implemented for the other next_serve(j) processes on the network element. A next_frame(i,j) process asserts the signal req(i,j) whenever the ingress queue j of port i is available for service. This signal is connected to the next_serve(j) process associated with port j, which decides the next ingress queue to forward frames to port j. The next_serve(j) process uses the array req(i,j), i=0 to n−1, and the previous history of served queues to decide the next queue to be served and asserts a signal grant(i,j), which is connected to the next_frame(i,j) process.

Upon detecting that grant(i,j) is asserted, the next_frame (i,j) process begins to forward frames (as required to satisfy the particular scheduling algorithm being implemented) from its ingress queue j to egress port j. For example, if round-robin scheduling is being implemented, only the frame at the head of the ingress queue j is forwarded to egress port j. After all desired frames are forwarded, next_frame(i,j) de-asserts the signal req(i,j) and waits until grant(i,j) is de-asserted before re-asserting req(i,j), i.e., when ingress queue j again becomes available for service. Once the next_serve(j) process detects that req(i,j) was de-asserted, it de-asserts grant(i,j) and asserts grant(i,j) of the next queue to be served, if any. If there are no requests for service, the next_serve(j) process stays in the same state, i.e., it remembers which next_frame(i,j) process was the last one to be served.

The two "handshake" interactions between next_frame(i,j) and next_serve(j) (i.e., next_frame(i,j) de-asserts the signal req(i,j) and waits until grant(i,j) is de-asserted before re-asserting req(i,j), if required, and next_serve(j) waiting for req(i,j) to be de-asserted before de-asserting grant(i,j) and asserting grant(i,j) of the next queue to serve) are used to allow these process to synchronize and coordinate their individual actions.

The invention is not restricted to the use the above defined signals and handshake operations, as other communication methods using different signals, handshake mechanisms, and synchronization methods are possible. For example, another signaling mechanism may be used that would allow the next_frame(i,j) process to communicate to the next_serve(j) process that it is available for service, and a signaling mechanism to allow the next_serve(j) process to communicate to the next_frame(i,j) process when it is time for it to forward frames. In addition, the next_frame(i,j) process needs to be able to communicate to the next_serve(j) process when it has finished forwarding frames. Thus, multiple types of handshake mechanisms may be implemented to coordinate action of the various processes.

Certain scheduling algorithms allow frames to be transferred only after a number of credits have accumulated. For example, a deficit round robin scheduling algorithm requires tokens to build up to a particular point for an ingress queue before that queue may transfer a frame. In the embodiment illustrated in FIGS. 4 and 5, the next_frame (i,j) process associated with the ingress queue is responsible for determining when it is ready to forward frames by asserting a request signal. To allow these processes to understand when to increment their token count, a visit signal may be used. The visit signal in this context simply enables a next_frame process to know that it could have transmitted a frame if it had asserted the request signal. In a round robin scheduling algorithm this signal may be ignored. In other scheduling algorithms, this signal may be used to identify a rotation or cycle in the process to allow it to update its counters in preparation to forward a frame.

The signal visit(i,j) is generated by the next_serve(j) process. It is used to communicate to the next_frame(i,j) process that it would have been served now if it had requested service (note that the next process to be served depends on the scheduling algorithm being implemented). The visit(i,j) signals of all the next_frame(i,j) processes that missed an opportunity to be served are activated concurrently with the activation of a grant(i,j) signal. For example, consider a round-robin scheduler where processes A, B, C, and D are in sequence in the round. Process A has just finished service, processes B and C are next in the round, but are not requesting service, and process D is requesting service. Process D would then be granted service concurrently with the activation of the visit signals for processes B and C. The visit signals indicate that processes B and C would have been served if they had requested service.

The visit(i,j) signal may be used by the next_frame(i,j) process to update its state. For example, with deficit round robin a quantum amount is added to the deficit counter and service availability is re-evaluated, which may result in the subsequent activation of the req(i,j) signal. Not all scheduling algorithms will make use of the visit(i,j) signal. For example, round-robin scheduling has no use for this signal since it does not need to know if a round has passed while it was not requesting service.

When two or more next_serve(j) processes concurrently grant service to ingress queues, those ingress queues will compete for switch fabric bandwidth. The above algorithm assumes that the switch fabric has enough throughput to handle concurrent frame transmissions from different ingress queues with minimum or no contention. If this is not the case, the switch fabric should provide a (preferably fair) back-pressure mechanism to pace the traffic from individual ingress queues. The back-pressure mechanism can give equal or different throughputs to different egress ports. This switch fabric back-pressure mechanism works in addition to the ones used by egress ports to pause ingress queues. The switch fabric back-pressure mechanism controls the maximum fraction of the switch fabric throughput each egress port can use during congestion periods. The switch fabric back-pressure mechanism may be controlled by a switch fabric scheduler in a known fashion.

Note that since an egress port uses a back-pressure signal to pause ingress ports to avoid egress queue overflow, or causes the next_serve process to pause prior to asserting additional grant signals, the aggregated average amount of traffic that a switch fabric is required to transport is limited by the aggregated throughput of the egress ports. The switch fabric back-pressure mechanism is used during periods of time when the total aggregated traffic exceeds this aggregated average or when the switch fabric has a throughput lower than this aggregated average amount.

The same type of multiple process scheduling mechanism may be used in a network element having a hierarchical architecture. For example, FIG. 3 illustrates a network element having multiple I/O cards 12, each I/O card having multiple ports 32 and a small on-board switch fabric 40 configured to interconnect the ports and aggregate the board traffic for transmission to another portion of the network element. The switch fabrics 40 thus serve as aggregation points in the network element. The board traffic is forwarded to a larger switch fabric 40 which transports frames between the I/O cards on the network element. This hierarchical architecture can be generalized to any number of aggregation points, as desired. For example, the switch fabric 18, may be used to aggregate traffic to an even larger switch fabric 46 (see FIG. 6) which may be used to transport the frames between similar hardware structures on the network element.

Figure 6:
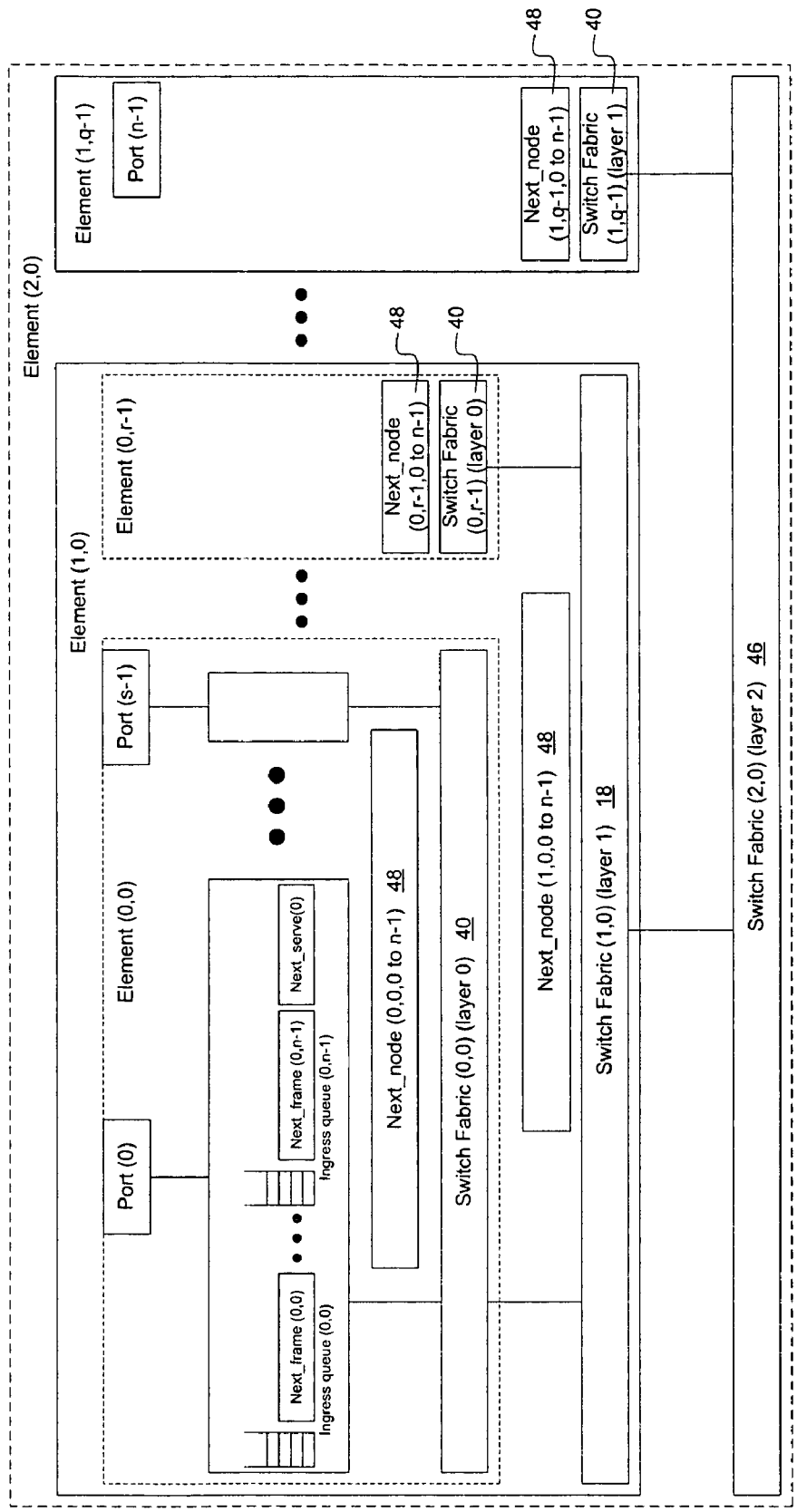
FIG. 6 is a functional block diagram of an hierarchical forwarding plane architecture including frame, port, and card coordination processes to coordinate forwarding of frames according to an embodiment of the invention.

Hierarchical architectures can benefit from a hierarchical implementation of the proposed method by using a hierarchy of processes. FIG. 6 shows an example of a network element with three layers of switch fabrics numbered from 0 to 2. A switch fabric is said to aggregate elements, which means that it allows for the forwarding of frames between these elements. The elements at each layer are identified by the layer number (k) and a sequence number (e) in that layer. The switch fabric inside an element is identified by the same pair of numbers, i.e., element(k,e) has switch fabric(k,e). In the notation used herein, the first number refers to the switch fabric layer and the second number refers to the element number.

Thus, switch fabric(k,e) aggregates elements of a lower layer, elements(k−1,0 to e'). In FIG. 6, switch fabric(2,0) aggregates element(1,0) to element(1,q−1), where these elements can be interpreted as being chassis partitions. The switch fabric(1,0) aggregates element(0,0) to element(0,r−1), where these elements can be interpreted as being boards. The switch fabric(0,0) aggregates the ports of element(0,0).

In the following description, it will be assumed that the network element has a total of n ports. The elements that are aggregated by a switch fabric at any layer may have each a different number of ports. At the lowest layer, the switch fabric is used to aggregate ports; at higher levels the switch fabrics are used to aggregate elements containing ports.

To coordinate between the different layers of hierarchy, the proposed hierarchical scheduling implementation adds a new process 48, referred to herein as next_node(k,e,j), to each element(k,e), where j is an egress port number and varies from 0 to n−1. For example, element(0,0) has next_node(0,0,j) processes for egress ports j=0 to n−1 and element(1,0) has next_node(1,0,j) processes, and so on.

In this embodiment, when a queue has a frame that is ready to be served, it asserts a request signal. The next_node process for the element receives the request signal and, as long as there is a request signal for one of its associated nodes, will assert a request signal to higher levels of next_node processes. A next_serve process for each port asserts grant signals to select between the next_node processes associated with the elements. Each time a next_node process receives a grant signal, it asserts a grant signal to one of its subservient next_node processes. When the layer 0 next_node process receives a grant signal, it asserts a grant signal to one of the next_frame processes to allow the ingress queue associated with that next_frame process to serve frames to the egress queue associated with the next_serve process. In this way, multiple processes may coordinate to implement a pull forwarding mechanism to enable the fair implementation of a scheduling algorithm.

Figure 7:
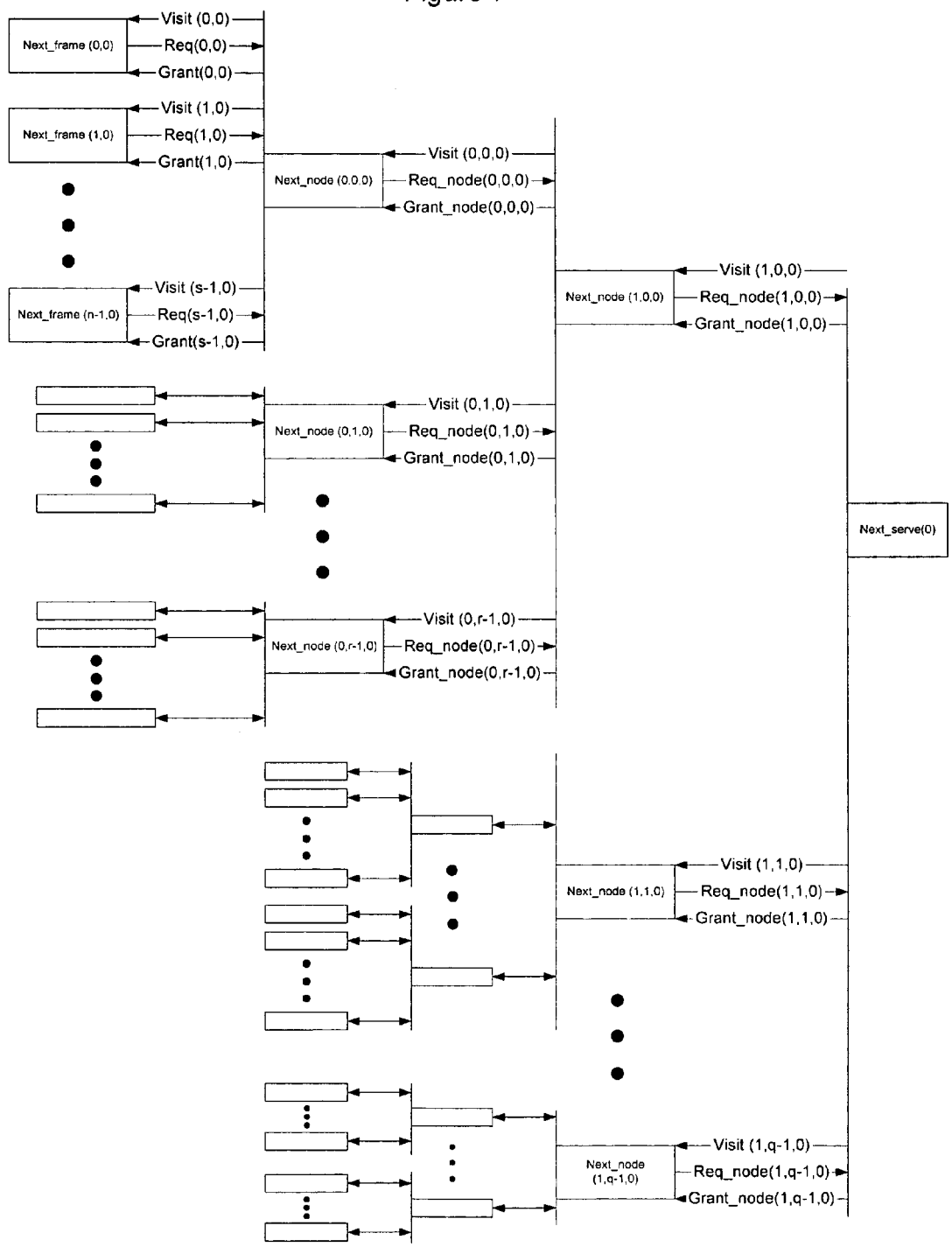
FIG. 7 is a functional block diagram illustrating signals exchanged between the frame, port, and card processes of egress port 0 of FIG. 6 to coordinate forwarding of frames according to an embodiment of the invention.

FIG. 7 illustrates signals to be exchanged between the processes in a hierarchical network element architecture. In the hierarchical architecture, as with the previous architecture, the next_frame(i,j) process of element(0,e) will generate a req(i,j) signal when it is ready to transmit frames, and will receive a grant(i,j) signal when it is to transmit frames. In this example, (i) is an ingress port number of element(0,e) (e.g., in FIG. 6, (i) ranges from 0 to s for element(0,0)) and j is an egress port number and varies from 0 to n−1. The next_frame (i,j) processes work in the same way described above for the non-hierarchical case. Specifically, the signals req(i,j) and grant(i,j) in element(0,e) are be connected to the next_node (0,e,j) process.

A next_node process coordinates between the elements to allow ports associated with different elements to transmit frames according to the scheduling algorithm. Specifically, the next_node(0,e,j) process generates the signals grant(i,j), where i is the index of a port in element(0,e), which are connected to the next_frame(i,j) processes. The next_node(0, e,j) process also generates the signals req_node(0,e,j), which are connected to the next_node(1,e',j) process. Note that e and e' may be different since e is the index number of an element in one layer while e' is the index of an element in the next layer. For example, in FIG. 6, req_node(0,1,0) connects to next_node(1,0,0). The signal req_node(0,e,j) is asserted when at least one of the signals req(i,j) connected to the next_node(0,e,j) process is asserted.

For higher layers, the next_node(k,e,j) process, for k>0, generates the signals req_node(k,e,j) and grant_node(k−1,e', j). Note that in this paragraph e, e', and e" may be different since they are the indexes of elements at different layers. The signal req_node(k,e,j) is connected to the next_node(k+1,e", j) process. The signal req_node(k,e,j) is asserted when at least one of the signals req_node(k−1,e',j) connected to the next_ node(k,e,j) process is asserted. The signal grant_node(k−1,e', j) is connected to the next_node(k−1,e',j) process.

The signals req_node(L−1,e,j) are connected to the next_ serve(j) process, where L is the index of the outmost layer (L=2 in the example of FIGS. 6 and 7). For example, req_ node(1,0,0) connects to next_serve(0). The next_serve(j) process, j=0 to n−1, is modified from the non-hierarchical version. It still works in the same way, but instead of generating grant(i,j) signals and receiving req(i,j) signals, it generates grant_node(L−1,e,j) signals and receives req_node(L−1,e,j) signals, respectively, where L is index of the outmost layer (L=2 in the example of FIGS. 6 and 7), e is the index of an element at layer L−1, and j=0 to n−1 (i.e., the range of ports supported by the network element). Therefore, next_serve(j) process uses the array req_node(L−1,e,j) and the previous history of asserted grant_node(L−1,e,j) signals to decide the next grant_node(L−1,e,j) signal to be asserted, i.e., granted service. For example, if round-robin (or deficit round robin) scheduling is being implemented, the next_serve(j) process asserts the grant_node(L−1,e,j) signal corresponding to the next element e in the round.

Upon detecting its received grant_node(k,e,j) signal is asserted, the next_node(k,e,j) process, for k>0, uses the array req_node(k−1,e',j) and the previous history of asserted grant_ node(k−1,e',j) signals to decide the next grant_node(k−1,e',j) signal to be asserted, i.e., granted service. For example, if round-robin (or deficit round robin) scheduling is being implemented, the next_node(k,e,j) process asserts the grant_ node(k−1,e',j) signal corresponding to the next element e' in the round.

Upon detecting its received grant_node(0,e,j) signal is asserted, the next_node(0,e,j) process uses the array req(i,j) and the previous history of asserted grant(i,j) signals to decide the next grant(i,j) signal to be asserted, i.e., granted service. For example, if round-robin (or deficit round robin) scheduling is being implemented, the next_node(0,e,j) process asserts the grant(i,j) signal corresponding to the next port (i) in the round, where (i) is a port in the element(0,e).

Upon detecting that grant(i,j) is asserted, the next_frame (i,j) process begins to forward frames (as required to satisfy the particular scheduling algorithm being implemented) from its ingress queue j to egress port j. For example, if round-robin scheduling is being implemented, only the frame at the head of the ingress queue j is forwarded to egress port j. After all desired frames are forwarded, next_frame(i,j) de-asserts the signal req(i,j) and waits until gant(i,j) is de-asserted before re-asserting req(i,j), i.e., when ingress queue j becomes available for service. Once the next_mode(0,e,j) process detects that req(i,j) was de-asserted, it de-asserts the grant(i,j) and req_node(0,e,j) signals and waits until grant_node(0,e,j) signal is de-asserted before it re-asserts req_node(0,e,j) again, i.e., if at least one of the its signals req(i,j) is asserted.

Upon detecting that req_node(k,e,j), for k>0, is de-asserted, the next_node(k+1,e',j) process de-asserts the signals req_node(k+1,e',j) and grant_node(k,e,j) and waits until grant_node(k+1,e',j) signal is de-asserted before it re-asserts req_node(k+1,e',j) again, i.e., if at least one of the signals req_node(k,e,j) is asserted. Once the next_serve(j) process detects that req_node(L−1,e,j) was de-asserted, it de-asserts grant_node(L−1,e,j) and asserts the next grant_node(L−1,e,j) signal (as required to satisfy the particular scheduling algorithm being implemented).

The "handshake" interactions between next_node(L−1,e,j) and next_serve(j) are used to allow these process to synchronize and coordinate their individual actions. In this example, one handshake process includes the next_node(L−1,e,j) process de-asserting the req_node(L−1,e,j) signal and waiting until the grant_node(L−1,e,j) signal is de-asserted before re-asserting the req_node(L−1,e,j) signal if required. Another handshake process includes the next_serve(j) process waiting for the req_node(L−1,e,j) signal to be de-asserted before de-asserting the grant_node(L−1,e,j) signal and asserting the next grant_node(L−1,e,j) signal.

Handshake interactions between the next_node(k,e,j) process and the next_node(k+1,e',j) process include the next_ node(k,e,j) process de-asserting the req_node(k,e,j) signal and waiting until the grant_node(k,e,j) signal is de-asserted before re-asserting the req_node(k,e,j) signal if required, and the next_node(k+1,e',j) process waiting for the req_node(k, e,j) signal to be de-asserted before de-asserting the req_node (k+1,e',j) signal and the grant_node(k+1,e',j)) signal. These handshakes are used to allow these process to synchronize and coordinate their individual actions.

Handshake interactions between the next_frame(i,j) process and the next_node(0,e,j) process include the next_frame (i,j) process de-asserting the req(i,j) signal and waiting until the grant(i,j) signal is de-asserted before re-asserting the req (i,j) signal if required; the next_node(0,e,j) process waiting for the req(i,j) signal to be de-asserted before de-asserting the grant(i,j) signal and asserting the grant(i,j) signal of the next queue to serve; and the next_node(0,e,j) process waiting for the grant_node(0,e,j) signal to be asserted before asserting the next grant(i,j) signal, if required. These handshakes are used to allow these process to synchronize and coordinate their individual actions.

The invention is not limited to this particularly described implementation, as other types of communication methods using different signals, handshake mechanisms, and synchronization methods are possible. For example, upon detecting that req_node(k,e,j), for k>0, is de-asserted, the next_node (k+1,e',j) process does not need to immediately de-assert the grant_node(k,e,j) signal. It could wait until the grant_node (k+1,e',j) signal is de-asserted before de-asserting the grant_ node(k,e,j) signal. This modification works, but increases the signaling delay between processes.

Coordination between the processes is facilitated by a signaling mechanism to allow the next_frame(i,j) process to communicate to the next_node(0,e,j) process that it has frames to be forwarded, and signaling mechanisms to allow the next_node(0,e,j) process to communicate to the next_ frame(i,j) process when it is time for it to forward frames. In addition, the next_frame(i,j) process needs to be able to communicate to the next_node(0,e,j) process when it has finished forwarding frames. The process also requires a signaling mechanism to allow the next_node(k,e,j) process to communicate to the next_node(k+1,e',j) process that it received a request to forward frames, and signaling mechanisms to allow the next_node(k+1,e',j) process to communicate to the next_node(k,e,j) process when it can grant permission to the requestor to forward frames. The next_node(k,e,j) process also needs to be able to communicate to the next_node(k+1, e',j) process when such requestor has released its request to forward frames. Additionally, the process requires a signaling mechanism to allow the next_node(L−1,e,j) process to communicate to the next_serve(j) process that it received a request to forward frames, and signaling mechanisms to allow the next_serve(j) process to communicate to the next_node(L−1, e,j) process when it can grant permission to the requestor to forward frames. The next_node(L−1,e,j) process then needs to be able to communicate to the next_serve(j) process when such requestor has released its request to forward frames. The communication should be designed in such a way that the processes are not likely to misinterpret the signals due to signal delays or noise.

The above described handshake interactions illustrate one embodiment that addresses these communication requirements. The invention is not limited to this embodiment however, as other techniques can also be used to meet these goals while allowing separate processes running on different places in the network element to coordinate their actions to implement a desired scheduling algorithm.

Visit signals may be used in a hierarchical architecture in a manner similar to that described above to inform ingress queues when they missed an opportunity to be served. In the embodiment illustrated in FIGS. 6 and 7 a visit(L−1,e,j) signal is generated by the next_serve(j) process to indicate when the next_node(L−1,e,j) process missed an opportunity to be granted service (via the grant_node(L−1,e,j) signal). The visit (k−1,e',j) signal is generated by the next_node(k,e,j) process to indicate when the next_node(k−1,e',j) process missed an opportunity to be granted service (via the grant_node(k−1,e', j) signal). The visit(i,j) signal is generated by the next_node (0,e,j) process to indicate when the next_frame(i,j) process missed an opportunity to be granted service (via the grant(i,j) signal). The visit signals of all the processes that missed an opportunity to be served are activated concurrently with the activation of a grant signal.

The visit(i,j) signal may be used by the next_frame(i,j) process to update its state. For example, with deficit round robin, a quantum amount is added to the deficit counter at each time the queue is eligible to be served, and service availability is re-evaluated based on the deficit counter and the presence of frames. Updating the state may thus result in the subsequent activation of the req(i,j) signal by the updated next_frame(i,j) process. Not all scheduling algorithms will make use of the visit(i,j) signal, however. For example, round-robin scheduling has no use for this signal since it does not need to know if a round has passed while it was not requesting service.

When two or more next_serve(j) processes concurrently grant service to ingress queues, those ingress queues will compete for switch fabric bandwidth. The above process assumes that the switch fabric has enough throughput to handle concurrent frame transmissions from different ingress queues with minimum or no contention. If this is not the case, the switch fabrics should provide a (preferably fair) back-pressure mechanism to pace the traffic from individual ingress queues. The back-pressure mechanism can give equal or different throughputs to different egress ports. This switch fabric back-pressure mechanism works in addition to the ones used by egress ports to pause ingress queues. The switch fabric back-pressure mechanism controls the maximum fraction of the switch fabric throughput each egress port can use during congestion periods. The switch fabric back-pressure mechanism is controlled by a switch fabric scheduler in a known manner.

Since an egress port uses a back-pressure signal to pause ingress ports to avoid egress queue overflow, the aggregated average amount of traffic that a switch fabric is required to transport is limited by the aggregated throughput of the egress ports served by that switch fabric. The switch fabric back-pressure mechanism is used during periods of time the total aggregated traffic exceeds this aggregated average or when the switch fabric has a throughput lower than this aggregated average amount.

The handshake mechanisms described above require signal changes to propagate up and down the process layers before a next_frame(i,j) process can be granted permission to forward frames. According to another embodiment of the invention, the next_frame(i,j) process may de-assert the req (i,j) signal before the last frame it intends to forward has completed transmission. In this embodiment, the arbitration process (i.e., process of handshake interactions) to determine and grant permission for the next next_frame(i,j) process to forward frames may be done in parallel with the transmission of the last frame of the previously granted next_frame(i,j) process. This technique may result in the overlap of frame transmissions to the same egress port. However, this can be solved by the use of receive FIFOs and a "pause" signal to pause a next_frame(i,j) process whenever the receive circuit is running behind.

Another problem not addressed above is the fact that scheduling decisions should be taken as fast as possible. For example, when implementing round robin scheduling, the next_node(k,e,j) and next_serve(j) processes should be able to decide the next grant_node( ) signal to be asserted in a constant number of clock cycles (preferably one clock cycle). This can be done with careful implementation of the scheduler using a state machine that can "jump" from any currently asserted grant_node( ) signal to the next desired one irrespective of the sequential round distance of the next signal from the current one. Also, a grant signal may be de-asserted concurrently with the assertion of the next grant signal to save time. Again, this can be done with the careful design of an appropriate state machine.

The previous description has focused on an embodiment in which ingress queuing is performed on a per egress port basis. Ingress queuing may be performed in other ways as well, and the invention is not limited to this embodiment. For example, ingress queuing may be performed on a per flow basis in which the ingress queues (i,j) store frames arriving from port i and going to egress port j, but in which the ingress queue is actually a plurality of queues, one queue for each flow arriving at ingress port i and to be output over the egress port j. In this embodiment, the flow queues will be identified as queue (f,i,j) where (f) identifies the flow, (i) identifies the ingress port and (j) identifies the destination egress port.

In this embodiment, the next_frame(i,j) process and everything else is the same. However, the next_frame(i,j) now controls the group of flow queues (0 to f,i,j), which collectively "represent" ingress queue (i,j). When the next_frame (i,j) process receives a grant(i,j) signal, a scheduling decision may be made to decide which flow queue is to be served next between flow queues (0 to f,i,j). For example, some flows could have higher priority than others, flows could be served in round robin order, or the flow queues could be selected in another manner.

The decision as to which flow to service between the several flow queues forming the ingress queue is separate from the device-wide scheduling process described above, which addresses scheduling of ingress ports. However, the flow scheduling process may affect the ingress queue scheduling process, as the two are not completely isolated. For example, if a deficit round robin scheduling algorithm is implemented to select between ingress flow queues, an ingress queue may not request service where it would have requested service had flow queuing not been implemented.

Additionally, the egress port may maintain a plurality of flow queues as well, and a scheduling algorithm may be implemented to select at the egress port which flow should be served. This may affect the decision as to the order in which grant signals should be applied.

It should be understood that all functional statements made herein describing the functions to be performed by the methods of the invention may be performed by software programs implemented utilizing subroutines and other programming techniques known to those of ordinary skill in the art.

The control logic may be implemented as a set of program instructions that are stored in a computer readable memory within the network element and executed on a microprocessor, such as a network processor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for implementing a scheduling algorithm in a network element, the method comprising the steps of:
   instantiating a plurality of first processes associated with ingress queues and configured to hold protocol data units for particular egress ports;
   instantiating a plurality of second processes associated with the egress ports; and
   communicating between the plurality of first and second processes to coordinate a transfer of the protocol data units from the ingress queues to the egress ports to implement a device-wide fair scheduling algorithm.

2. The method of claim 1, wherein the ingress queues are associated with flows of protocol data units being handled by the network element.

3. The method of claim 1, wherein the protocol data units are queued at the ingress queues on a per egress queue basis.

4. The method of claim 1, wherein each egress port is associated with a respective egress queue, and wherein the egress queues are configured to receive protocol data units upon transfer of the protocol data units to the egress ports.

5. The method of claim 1, wherein the step of coordinating the transfer of the protocol data units comprises engaging in a handshake between the first and second processes.

6. The method of claim 1, wherein the step of coordinating a transfer of protocol data units comprises coordinating between a plurality of the first processes to thereby coordinate the transfer of protocol data units from the plurality of ingress queues to the egress port.

7. The method of claim 6, wherein the step of coordinating a transfer comprises asserting, by a first of the first processes, a request signal indicating the ability to transfer a protocol data unit; and asserting by the second process, a grant signal indicating that the first of the first processes is allowed to transfer the protocol data unit.

8. The method of claim 7, wherein the step of coordinating a transfer further comprises asserting, by the first of the first processes, a release signal; and asserting, by the second process, a grant signal indicating that a second of the first processes is allowed to transfer the protocol data unit.

9. The method of claim 1, wherein the step of coordinating a transfer of protocol data units comprises instantiating at least one third process, said third process being configured to select between the second processes.

10. A network element, comprising:
    a data plane configured to handle protocol data units on a communication network, said data plane including a plurality of ingress ports and a plurality of egress ports, and a plurality of ingress queues configured to store said protocol data units at said ingress ports; and
    a plurality of processes implemented on the data plane and configured to selectively communicate with each other to implement a device-wide fair scheduling algorithm.

11. The network element of claim 10, wherein one of the processes is associated with each of the ingress queues.

12. The network element of claim 10, wherein the data plane has aggregation points, and wherein one of the processes is associated with the aggregation points.

13. The network element of claim 10, wherein one of the processes is associated with each of the egress ports.

14. The network element of claim 10, wherein the processes include three classes of processes, a first of the classes of processes is associated with each of the ingress queues, a second of the classes of processes is associated with the aggregation points; and a third of the classes of processes is associated with each of the egress ports.

15. The network element of claim 14, wherein the a process in the third class of processes is configured to control a subset of the second class of processes, and wherein a process in the second class of processes is configured to control a subset of the first class of processes.

16. The network element of claim 14, wherein the processes communicate by asserting request, grant, and release signals.

17. the network element of claim 16, wherein the processes further communicate by asserting visit signals.

18. The network element of claim 10 wherein the device-wide fair scheduling algorithm is a round robin scheduling algorithm.

19. The network element of claim 17, wherein the device-wide fair scheduling algorithm is at least one of a priority scheduling, deficit round robin, negative deficit round robin, and weighted round robin, scheduling algorithm.

* * * * *